United States Patent Office 3,468,745
Patented Sept. 23, 1969

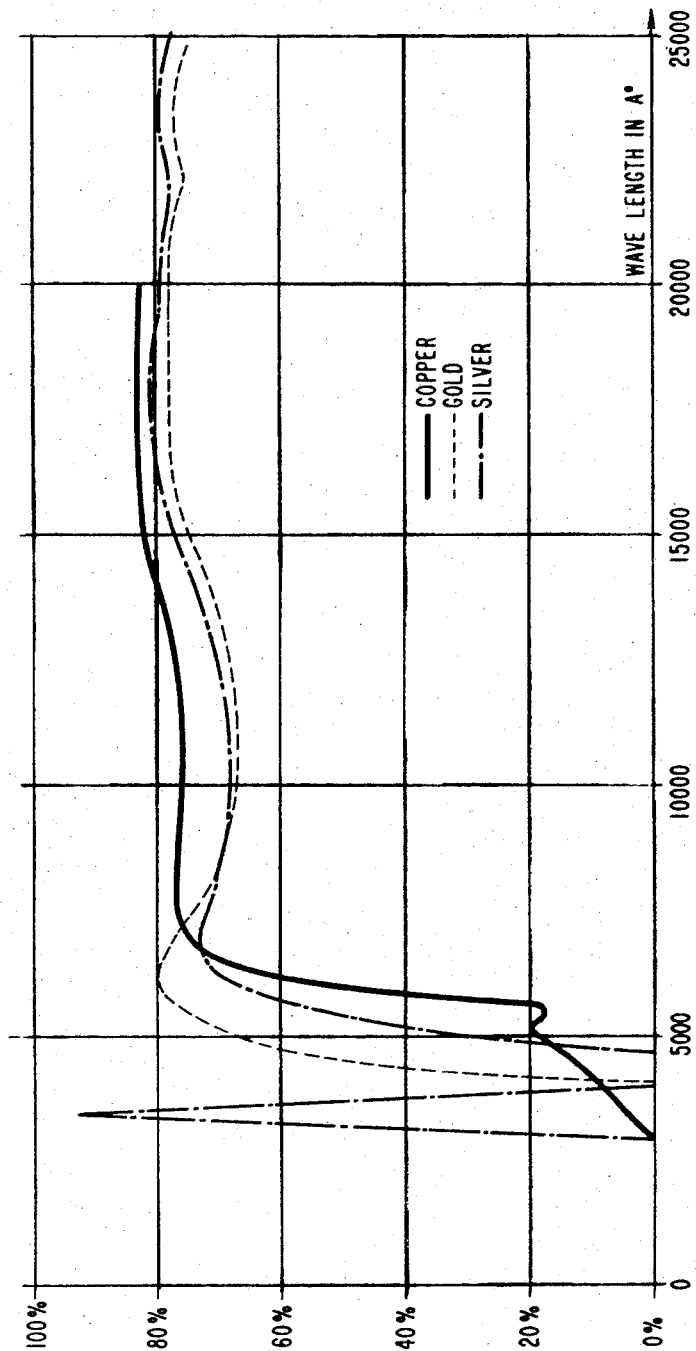

3,468,745
METHOD OF COLORING GLASS AND SAID COLORED GLASS
Maurice Navez and Albert Bezombes, Paris, France, assignors to Compagnie de Saint-Gobain, Neuilly-sur-Seine, France
Continuation-in-part of application Ser. No. 177,717, Mar. 6, 1962. This application Aug. 16, 1966, Ser. No. 571,434
Claims priority, application France, Mar. 13, 1961, 855,422
Int. Cl. B32b 5/18; C03c 17/10
U.S. Cl. 161—164                                    17 Claims

ABSTRACT OF THE DISCLOSURE

A glass having an internal layer of coloring metal ions, which has been made by contacting the surface of the glass while in the plastic state with molten metal comprising tin to create in the surface of the glass a reducing condition and applying a reducible coloring metal compound such as a salt of copper, gold or silver, to said surface and heating to reduce the metal compound and cause migration of the metal ions into the glass.

---

This is a continuation-in-part of the U.S. application identified as Ser. No. 177,717 filed on Mar. 6, 1962, now abandoned for "Method of Coloring Glass," partaking of the priority of French application Ser. No. 855,422 filed on Mar. 13, 1961.

This invention relates to the coloring of glass. It has heretofore been proposed, e.g., in British Patent No. 454,-448, to color glass by coating it with coloring materials and firing the materials on its surface.

For instance copper sulfide as color and yellow ochre as an auxiliary were painted or sprayed onto a sheet of glass containing an alkali and the sheet was fired at 600°–700° C., annealed and cooled. The color in the glass was a yellow produced by the copper sulfide which could be turned to red by passing the glass through a hot lehr in contact with a reducing agent. Reduction was necessary to produce the red.

It is known to be possible to color a glass sheet by surface cementation accomplished by spreading a paste of kaolin and a reducible metal salt on the glass, which is then heated in reducing medium to temperatures on the order of 600°–700° C. The metal resulting from the reduction diffuses into the glass and imparts it color, which varies according to the metal. The same cementation process was also used with silver salts, usually the chlorides, but results were usually poor unless a metal sulfide was present and a reduction step employed. The process was unsatisfactory when applied to glass containing oxidizing agents such as the sulfates which are a normal part of many glasses.

It is an object of this invention to eliminate reduction and to color glass in a more convenient way. The applicants' invention includes a first step of treating the surface with molten tin or a molten tin alloy, applying a solution or suspension of an easily reducible compound of a metal and, after vaporizing or otherwise eliminating the carrier liquid, heating the sheet with its coloring coat to 600°–700° C. This process does not include reduction of the salt or oxide employed in coloring, yet surprisingly, the colors produced are those which are indicative of the presence of fully reduced metal. It simplifies the process and eliminates apparatus to avoid the step of reduction Another object is to produce such colors with aerosols, or mists, of the coloring matter, a method of extreme novelty, with atomized sprays of the coloring matter, and by the use of solutions and suspensions. It is another object to extend the use of such coloring techniques to glasses containing sulfates and other oxidizing agents.

It is another object of the invention to produce colored glass not by applying a revetment but by impregnation of the glass with the coloring material. Another object is to eliminate the reducing atmospheres and coating pastes which have been necessary to the prior art, and to color the glass from the surface without altering the surface of the glass. Another object is to produce rose to red colors with copper salts or oxides without reduction and equivalent colors from gold or silver salts and oxides.

Glass which has been in contact with the molten metal at softening temperatures is useful in this process. It is useful, but not essential, to apply the molten metal to the glass at the temperature at which the glass is formed, for instance before it has cooled far below its temperature of formation. There is a process of making glass sheet in which the molten glass issues from a furnace and forming machinery to be floated on or immersed in a molten metal bath, especially a tin or tin alloy bath, from which it is eventually withdrawn to be perfected and cut to size. Such glass remains in contact with the molten metal bath at a temperature from about 500° C. to about 1200° C. for several minutes. Such glass has undergone a treatment which constitutes a satisfactory first step of this process and can be colored at once. The shape of the glass is unimportant as the process is applicable to all shapes.

The objects of the invention are accomplished, generally speaking, by a method of coloring glass which comprises applying to a face of metal bath glass an aqueous dispersion of a reducible salt of a metal, especially of Cu, Ag, and Au, drying the dispersion on the glass and thereby depositing a coating of the salt on the glass, heating the coated glass to a temperature somewhat below its deformation point and cooling the glass. In another form of the invention the drying step is omitted except as it may be thought to be a part of the heating-coloring step.

In the practice of the invention the salt solution should be applied to a face of glass which has previously been in contact with the molten metal. The salts of Ag, Au, and Cu are particularly useful, the Cu salts producing tones from rose to red and the Ag salts producing tones from clear yellow to yellow-brown. Au produces greenish-yellow tones. Copper sulfate and silver nitrate are readily available to our process although not to the prior art, and produce good results. They are representative of the oxides and salts of Ag, Cu, and Au which are useful.

The glasses which are most frequently used in the process are usually called silica-soda-lime glasses, or ordinary glass, and have a composition on the order of $SiO_2$ 68–74% by weight, $B_2O_3$ 0–2%, $Al_2O_3$ 0–5%, alkaline earth oxides (usually CaO and MgO but frequently including BaO or other MO oxides) 8–14%, and alkali oxides 12–18% (usually containing not much less than 50% $Na_2O$, the remainder being one or more of $M_2O$ oxides, e.g., $Li_2O$ or $K_2O$). A standard composition is $SiO_2$ 68–73%, $Al_2O_3$ 0–5%, $Na_2O+K_2O$ 12–17%, and $CaO+MgO$ 10–15%.

The compound of the metal which is to be employed in the process is intimately dispersed throughout the carrier liquid, which is usually water. This dispersion may be accomplished by dissolving the compound in the water or it may, when insoluble, be done by suspending the salt, in finely divided form such as a fine powder, in the water. The concentration of the solutions which are suitable for the production of satisfactory coloration will vary according to the salt or oxide which is employed. For example, when copper sulfate is used, satisfactory results are achieved with a solution containing about 2 to about 10% by weight of the salt. When copper nitrate is used the solution may well contain between 0.05 and 0.15% of the salt. These concentrations are most useful when the solution is applied to the glass in the cold, but when the solution is applied by spraying against the surface of hot glass, for instance at a temperature somewhat below its softening temperature, for instance between 600° and 700° C., the concentration of the solution of copper sulfate may well be between 10 and 20% and the concentration of the solution of silver nitrate may well be between 2 and 3%.

In applying the process to cold glass the solution, for example copper sulfate, is made up in water to the selected concentration, for instance 5% by weight, and the solution is applied to a surface of the glass which has been in contact with the molten metal. The solution is dried on the face of the glass under any convenient conditions of temperature and pressure with this provision that the temperature should not be permitted to reach the boiling point of the solution. This deposits a dry film of the metal salt on the face of the glass. The coloration is then imparted to the glass by heating the glass to 600° to 700° C., the temperature at which a sufficient decomposition of the salt occurs to release metallic ions which migrate into the salt occurs to release metallic ions which migrate into the glass and impart color to it. If a single application of salt is not sufficient to impart the depth of color desired a plurality of applications and dryings can precede the heat treatment, or a plurality or single salt sprayings followed by a plurality of heat treatments may be employed. The surface of the glass retains the same characteristics which it had when it issued from contact with the molten metal, but it is found to be colored inwardly from the surface of application to a preceptible depth. This novel glass may thus be described as having a substantially unmarred surface impregnated with and colored by a metal.

One may, according to this invention, produce colors of different intensities either by varying the concentration of the solution applied to the glass or by repeating the operations of application.

In another form of the invention the glass is heated to a temperature between 600° and 700° C., somewhat below its softening point, and is sprayed with a solution of the selected metallic salt, for example silver nitrate. The water of the solution will vaporize as it comes in contact with the hot glass. The spraying is continued as long as is necessary to provide a thickness of the salt deposit which will produce the depth of color desired in the glass. The sheet of glass, thus coated, is brought while still hot to a temperature somewhere between 650° and 680° C. and is maintained at that temperature for several minutes.

The glass is then cooled and washed wtih pure water or ammonia water. The colorations produced are similar to those produced by the cold process first described but are usually somewhat less intense.

The utilization of the invention is technically simple. In one form, for example, the surface of the glass which has been in contact with the molten metal comprising tin (tin and its alloys) is coated in the cold with a layer of liquid which is a solution or a dispersion of fine particles of chosen metallic composition. The liquid is evaporated (for example if an aqueous solution of copper salt has been used, the water will be evaporated off under suitable conditions of temperature and pressure) leaving a deposit of the salt on the glass. The glass is then heated between 600° and 700° C. and the coloration develops at this temperature. The heating may be continued until the development of the color has attained a maximum, which may be for several seconds, minutes, or longer periods depending upon the salt. Examination of the glass after coloring shows that it has been colored to an appreciable depth and has not been coated.

According to another form of the invention the glass is heated to a temperature between 600° and 700° C., after having been in contact with the molten tin bath, and is sprayed with an atomized solution or suspension of the metallic compound, the liquid medium being evaporated or destroyed as it comes in contact with the hot glass. Heating is continued at 600°–700° C. for several minutes, for instance in a furnace, to complete the coloration.

In a third form of the invention, the glass, after contact with the molten tin bath, is put into a furnace heated between 600° and 700° C. which contains an aerosol or fog of the metallic compound. The coloration proceeds actively.

In the first of these forms of the invention the intensity of coloration is related to the concentration of the metallic compound in the liquid carrier. In the second and third forms of the invention it is related to the length of the treatment under the spray and to the duration of the exposure to the fog as the case may be. In all forms the intensity of the color is related to the length of treatment, and the temperature of treatment in contact with the metal salt or oxide. When creating a mist of a solution or a suspension, spray guns of pneumatic type, operating normally on the solution or suspension, are used.

The surface of the sheets of glass, in all forms of the invention, remains substantially the same as it was prior to the treatment. The concentrations which have been given above produce good depth and good homogeneity of the color of the glass.

In order to indicate the generality of the process with respect to the salts which can be employed, and taking the silver salts as exemplary, salts as diverse in their chemical and physical properties as the oxides, which may be thought of as salts in this process, the bromide, the chloride, the chlorate, the nitrate and the sulfate are all useful. The process is carried out in the air, that is to say under oxidizing conditions, and need not be applied in a reducing atmosphere. The process does not apply a revetment to the glass. The process is useful with the insoluble as well as the soluble salts. Many of the most useful salts contain oxygen.

The liquid carriers for the metallic compounds may be of various sorts, e.g.: water to make aqueous solutions of water soluble compounds and suspensions of finely divided insoluble compounds; for spreading on the glass in the cold, using CuO as an example, dispersions can be made in aqueous media containing, in addition to water, dispersants such as methylcellulose, carboxymethylcellulose, and dextrine; for making nonaquous dispersions or solutions the alcohols, e.g. ethyl, and essence of terebenthine (oil of turpentine) with or without terpenic oils or waxes.

The compositions other than water impart some viscosity to the medium and maintain a homogeneous dispersion of the metal compound. The concentration used in such media may be similar to the concentrations of the metal compounds in water. The nonaqueous components are destroyed or vaporized before the glass attains 600° C. and do not affect the process.

When atomization is at elevated temperature the carrier liquid need not be viscous, and may conveniently be such as ethyl alcohol or pure oil of turpentine.

The drawing is a set of curves showing the percentage of light wave lengths from 0 to 25,000 A. transmitted by a differently colored glass of this invention. The solid line represents the glass metaled with copper, the dash line represents the glass metaled with gold, and the dash-dot line represents the glass metaled with silver, by this process.

The following examples are given as illustrations only:

EXAMPLE 1

Metal bath glass which has been floated on molten tin during its manufacture, was preheated in an electric furnace during 3 minutes at 700° C. and then sprayed with a 10% by weight solution of copper sulfate for 10 seconds.

After being sprayed the glass was put into an electric furnace at 700° C., and maintained therein for 3 minutes 30 seconds, after which the power was turned off and the glass was allowed to cool slowly in the furnace. When cooled the glass was colored ruby red on the face that had been in contact with the molten tin bath.

EXAMPLE 2

Metal bath glass was preheated in an electric furnace at 700° C., during 3 minutes, removed from the furnace and then immediately coated during 15 seconds with a solution of silver nitrate at 2.5% by weight. After being sprayed with the solution the glass was put into a furnace at 680° C., and after the heating the current was turned off to enable the glass to cool slowly, which required about 12 hours.

After cooling, the glass on one face was colored yellow.

The intensity of the color may be varied as desired in modifying either the concentration of the solution or the duration of spraying.

The glass, once treated with the tin, retains those acquired qualities which fit it for coloration by this novel process indefinitely.

Instead of slow cooling in the furnace, the glass may be removed from the furnace and rapidly cooled by air jets to obtain tempered glasses, or annealed, as desired. The colors of the glasses are not greatly affected by the rate of cooling.

It is apparent that a new phenomenon is present in the process because the inclusion of tin components in the glass batch does not produce a glass capable of coloration by this method, because "reduced metal" tones are obtained without reduction processes and in oxidizing or inert media, because sulfates and other oxidizing components may be present in the glass. To explain this is very difficult and the following theory is not binding on the inventors:

When in contact with the molten tin, a certain number of sodium ions are leached out or migrate from the surface of the glass into the tin but this migration is not compensated by an equivalent counter migration of tin ions, leaving lacunae in the glass skeleton which are negatively charged. The copper, silver, and gold ions in the metallic salts or oxides appear in their media with positive charges Au+, Cu+, and Ag+ and migrate into the lacunae where they lose their positive charges and are reduced to the metallic state, producing a stable, colored surface, the metal of which penetrates to an appreciable depth and does not form a surface accretion.

When sheet glass is made by the flotation process it may readily be tinted by this method. The process is easy of application, requires only apparatus which is found in most glass factories, produces agreeable colors without marring the surface of the glass, produces colorations differing according to the metallic ion which is caused to migrate into the glass, and produces a depth of color related to the concentration of the solution used or the quantity of salt deposited during the process.

Inasmuch as it is not necessary that the glass be free of oxidizing agents, contrary to the necessities of the cementation process, all silica-soda glasses containing the usual fining agents, various metal oxides for coloring, and the like can be employed with satisfactory results, which was not true of the prior art. It is simply necessary that they shall be treated in a first step, in the plastic state, with molten tin or tin alloy, that they then be brought into contact with the coloring materials of this invention and heated to the requisite temperature. The final color of the glass by transmitted light will be a composite of the coefficients of absorption due to the original color of the glass and the color imparted by this invention. As an example, gray glass is produced by including in a silica-soda-lime glass a small proportion of iron oxide, chromium oxide, and cobalt oxide, producing an approximately neutral tone which has a coefficient of absorption which is substantially uniform through the whole visible spectrum. When such glass is treated according to this invention it can be made to substantially cut off the light below a certain wave length without affecting the transmission factors for the other wave lengths. Thus, by eliminating the shorter rays one may change the tonality of the coloration to produce a more purple hue.

What is claimed is:

1. A method of coloring glass containing silica and soda which comprises heating at least the portions of the glass which are to be colored to a plastic condition, putting at least said portions in contact with a molten metal comprising tin, until said portions have thus acquired reducing properties in at least a superficial layer from contact with the molten metal, separating the glass from the metal, applying a coating of a reducible compound of a glass coloring metal to said portions of the glass to be colored, heating the glass and coating of the reducible compound in contact with each other to a temperature circa 600°–700° C. in a nonreducing atmosphere, for a time sufficient for the surface of the glass to reduce at least a portion of said compound to the metallic state and to cause migration of the metal into the superficial layer of the glass and thus impart color to the glass, cooling the glass and removing any residues from its surface.

2. A method according to claim 1 in which the said compound contains oxygen.

3. A method according to claim 1 in which the said compound is an oxygen-containing compound of gold.

4. A method according to claim 1 in which the said compound is an oxygen-containing compound of silver.

5. A method according to claim 1 in which the said compound is an oxygen-containing compound of copper.

6. A method according to claim 1 in which the compound is selected from the group consisting of the oxides, the bromides, the chlorides, the chlorates, the nitrates and the sulfates of the glass coloring metals.

7. A method according to claim 1 in which the compound is selected from the group consisting of the oxides, the bromides, the chlorides, the chlorates, the nitrates and the sulfates of metals of the group consisting of gold, copper and silver.

8. Silica-soda glass containing oxidizing components, which has substantially normal light transmission factors for wave lengths above 5000–6000 A. (computed as copper) and a sharp reduction of equivalent transmission factors for lesser wave lengths, in which sodium is wanting in a superficial layer as compared to the body of the glass and a coloring metal is present in said surface layer and which has in said layer the color imparted by the metallic form of said coloring metal, produced by the process of claim 1.

9. Glass according to claim 8 in which the coloring metal is copper and the color is rose to red.

10. Glass according to claim 8 in which the coloring metal is silver and the color is yellow to yellow-brown.

11. Glass according to claim 8 in which the coloring metal is gold and the color is greenish yellow.

12. Glass according to claim 8 in which the curve of transmission drops from about 80% to less than 20% between 6000 and 4000 A.

13. A method of coloring glass which comprises bringing the surface of the glass containing alkali metal ion which is to be colored, while in the plastic state, into contact with a molten metal bath comprising tin, for a time sufficient for the surface of the glass to acquire reducing properties in at least a superficial layer, removing the glass with its acquired reducing surface layer from contact with the bath and coating it with liquid dispersion of a reducible salt of a glass coloring metal, heating it to about 600° to 700° C. until the reducible salt is reduced by the surface of the glass and the reduced metal migrates into the glass and colors the glass, the conditions being such that the salt is reduced solely by the surface of the glass, and cooling the glass.

14. A method according to claim 12 in which the compound of the coloring metal is applied to the glass in the form of a layer of liquid containing the compound dispersed therein.

15. A method according to claim 12 in which a liquid containing the compound of the coloring metal is sprayed upon the glass.

16. A method according to claim 12 in which the glass is treated with a gaseous suspension of the compound of the coloring metal.

17. A method of coloring a glass sheet containing alkali metal ion having one of its faces which has been in contact with molten tin while in the plastic state and has thus acquired reducing properties in its superficial layer, said method comprising maintaining a compound of a coloring metal in contact with said face at a temperature of 600°–700° C. during a time sufficient for said surface to at least partially reduce said compound to the metalling state, and to obtain the penetration of the coloring material in the ionic state into said superficial layer whereby there is obtained a glass sheet containing the coloring metal within the superficial layer and the glass sheet is uncoated.

References Cited

UNITED STATES PATENTS

| | | | |
|---|---|---|---|
| 2,075,446 | 3/1937 | Leibig | 65—30 XR |
| 2,701,215 | 2/1955 | Kroeck | 65—30 XR |
| 2,732,298 | 1/1956 | Stookey | 65—30 XR |
| 3,083,551 | 4/1963 | Pilkington | 65—99 XR |

S. LEON BASHORE, Primary Examiner

J. H. HARMAN, Assistant Examiner

U.S. Cl. X.R.

65—30, 60, 90, 182; 106—52; 117—124